United States Patent
Kakigi

4,095,182
June 13, 1978

[54] DISPLAY DEVICE FOR TRANSCEIVER AND LIKE

[75] Inventor: Takao Kakigi, Kawasaki, Japan

[73] Assignee: Cybernet Electronic Corporation, Kanagawa, Japan

[21] Appl. No.: 724,173

[22] Filed: Sep. 17, 1976

[30] Foreign Application Priority Data

Oct. 8, 1975 Japan .................................. 50/137843
Oct. 8, 1975 Japan .................................. 50/137844

[51] Int. Cl.² .................................................. H04B 1/40
[52] U.S. Cl. .......................................... 325/17; 325/455
[58] Field of Search ...................... 58/50 R; 325/15–18, 325/25, 455

[56] References Cited

U.S. PATENT DOCUMENTS

| 3,646,751 | 3/1972 | Purland | 58/50 R |
| 3,664,116 | 5/1972 | Emerson | 58/50 R |
| 3,672,155 | 6/1972 | Bergey | 58/50 R |
| 3,911,253 | 10/1975 | Torresdal | 325/455 |
| 3,962,858 | 6/1976 | Levine | 58/50 R |
| 4,004,232 | 1/1977 | Amaya | 325/455 |
| 4,009,451 | 2/1977 | Moore | 325/25 |
| 4,013,957 | 3/1977 | Tojo | 325/455 |
| 4,024,477 | 5/1977 | Yamaguchi | 325/455 |

*Primary Examiner*—Robert L. Richardson
*Assistant Examiner*—Michael A. Masinick
*Attorney, Agent, or Firm*—Oblon, Fisher, Spivak, McClelland & Maier

[57] ABSTRACT

A display device for use in a transceiver and the like having a display section which normally performs digital time display and, as occasion demands, performs channel display by the aid of a change-over switch.

6 Claims, 4 Drawing Figures

4,095,182

DISPLAY DEVICE FOR TRANSCEIVER AND LIKE

BACKGROUND OF THE INVENTION

1. Field of the Invention

The present invention relates to a display device for a transceiver and the like and, more particularly, to a display device for a car transceiver having a display section which can alternatively perform time display at normal times and channel display during transmission and reception.

2. Description of the Prior Art

Generally, a conventional car transceiver is provided with a display device, formed of a dial and other means, for displaying a channel in use during transmission and reception, while it is provided with a time-indicating apparatus such as a car clock incorporated therein independently of the above channel display device. However, a car transceiver is generally set in a limited space, and therefore it is very disadvantageous due to spatial restriction to separately provide the clock and the channel display device connected to the transceiver proper. In addition, a car clock is generally very inaccurate, and accordingly time correction therefor must be often carried out.

BRIEF SUMMARY OF THE INVENTION

It is an object of the present invention to provide a display device for a transceiver and the like which can performs both time display and channel display in one display section.

It is another object of the present invention to provide a display device for a transceiver and the like which can perform very accurate time counting and time display.

It is still another object of the present invention to provide a display device having a display section which normally performs time display and, as occasion demands, can be switched over to channel display.

Other objects, features and advantages will be more apparent from the following description in conjunction with the accompanying drawings.

DESCRIPTION OF THE PREFERRED EMBODIMENTS

Figure 1:
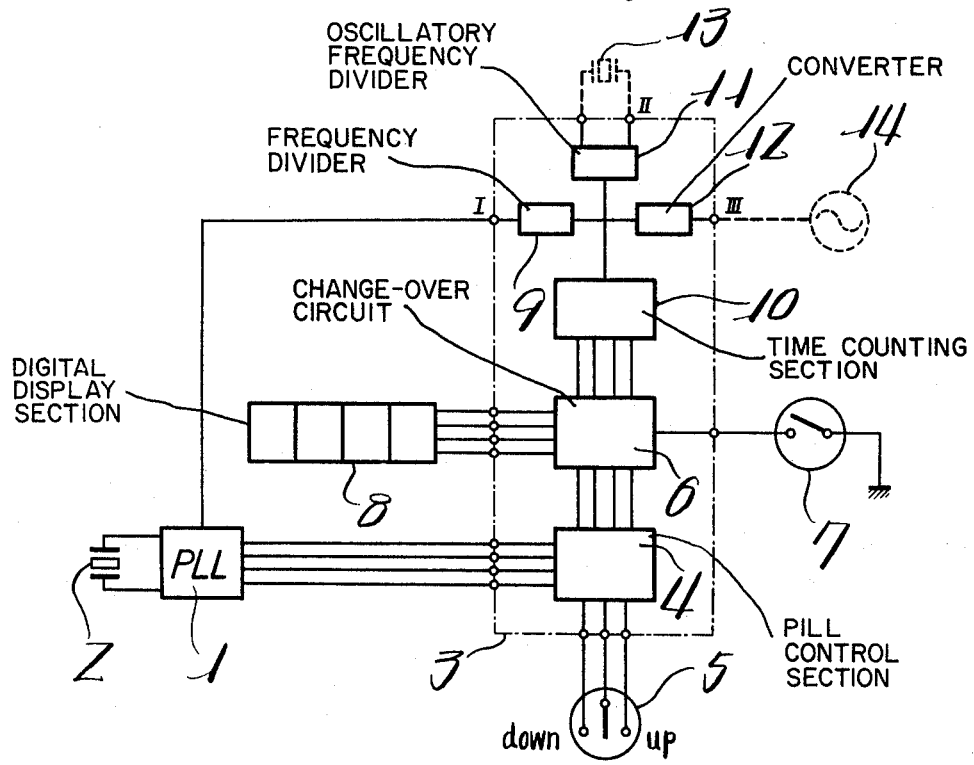
FIG. 1 is a circuit diagram showing an embodiment according to the present invention.

Referring now to the drawings wherein like reference numerals designate identical or corresponding parts, and more particularly to FIG. 1, the display device for a transceiver and the like according to the present invention will be hereinafter described.

Numeral 1 designates a phase-locked loop provided with a reference oscillator 2 acting as a pulse-generating section. This phase-locked loop 1 is connected to a phase-locked loop control section 4 provided in a LSI (large-scale integration) chip 3. The phase-locked loop control section 4 is connected to a channel select switch 5, and is also connected to a change-over circuit 6 so that the same signal as that fed to the phase-locked loop 1 can be given. The change-over circuit 6 is further connected to a manual change-over switch 7 externally provided, and also to a 4-position digital display section 8.

The phase-locked loop 1 is connected to a frequency divider 9 provided in the LSI chip 3 through a terminal I so that signals generated from the reference oscillator 2 can be fed to the frequency divider 9. The frequency divider 9 is connected to a time-counting section 10, which is connected to the above-mentioned change-over circuit 6.

In the LSI chip 3, an oscillatory frequency divider 11 and a converter section 12 are provided in connection with the time-counting section 10, respectively. The oscillatory frequency divider 11 is connected to two terminals II to which a crystal oscillator 13 externally provided is to be connected. The converter section 12 is connected to a terminal III to which a commercial 50 Hz or 60 Hz power supply 14 is to be connected.

Figure 2:
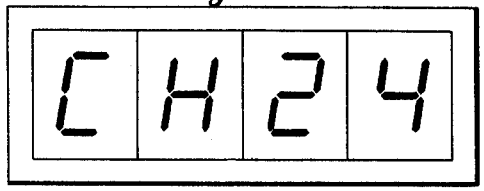
FIG. 2 is a front view of the display section according to the present invention, showing the condition at the time when it is performing channel display.

In such a construction of the device as set forth above, the change-over circuit 6 is in a state where it can transmit signals from the phase-locked loop control section 4 to the digital display section 8, since the change-over switch 7 is of a normally open type. Thus, a channel set at the phase-locked loop 1 is displayed on the digital display section 8 as shown in FIG. 2, each time when the channel select switch 5 is operated to switch the channel. During this time, signals generated from the reference oscillator 2 are at all times applied to the time-counting section 10 for continuous time-counting operation.

Figure 3:
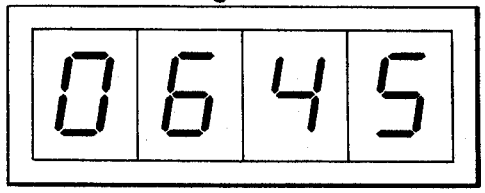
FIG. 3 is a front view of the display section according to the present invention, showing the condition at the time when it is performing time display.

When the change-over switch 7 is closed, the change-over circuit 6 is switched to a state where it cuts off the signals transmitted from the phase-locked loop control section 4 and supplies signals, transmitted from the time-counting section 10, to the digital display section 8. Thus, the digital display section 8 displays the time digitally as shown in FIG. 3.

As mentioned above, the LSI chip 3 is provided with the terminals II and III. Thus, signals may be given to the time-counting section 10 without connection with the phase lock loop 1 by connecting an independent crystal oscillator 13 to the terminals II or by connecting a commercial power supply 14 to the terminal III.

It will be understood from the foregoing description that the display device according to the present invention is provided with a change-over circuit which is connected to a digital display section and can be switched by a change-over switch and which is connected to a phase-locked loop and a time-counting section, and therefore can perform both channel display and time display in one digital display section and thereby can minimize the space required therefor without provision of a separate clock.

Figure 4:
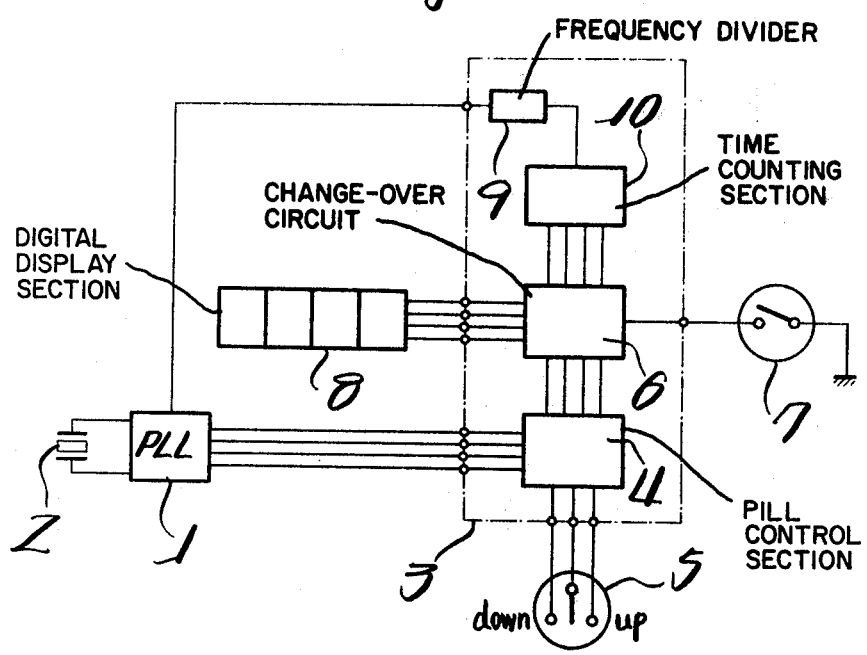
FIG. 4 is a circuit diagram showing another embodiment according to the present invention.

Another embodiment of the present invention will be hereinafter described with reference to the accompanying FIG. 4. Reference numeral 1 designate a phase-locked loop equipped with a reference oscillator 2. The phase-locked loop 1 is coupled to a phase-locked loop control section 4 provided in an LSI chip 3. To the phase-locked loop control section 4 are connected a channel-selecting switch 5 and a switching circuit 6 for giving the same signal as that fed to the phase-locked loop 1. To the switching circuit 6 are connected a manually-operated change-over switch 7 which is externally provided and a four-column digital display section 8 for digital display.

The phase-locked loop 1 is also connected to a frequency divider 9 provided in the LSI chip 3 so as to feed signals from the reference oscillator 2. The frequency divider 9 is connected to a time counting section 10, which is connected to the switching circuit 6.

The operation of this configuration is as follows:

Since the change-over switch 7 is of a normally open type, the switching circuit 6 is kept in the position where it can feed signals received from the phase-locked loop control 4 to the digital display section 8. Therefore, a channel which is set by the phase lock loop 1 is displayed as shown in FIG. 2 every time when the channel is switched by operating the channel-selecting switch 5. Meanwhile, the signals from the reference oscillator 2 are at all times fed to the time counting section 10, and therefore time counting is carried out continuously.

When the change-over switch 7 is closed, the switching circuit 6 is switched to the position where it can cut off signals received from the phase-locked loop control section 4 and feed signals received from the time counting section 10 to the digital display section 8. Thus the digital display section 8 digitally indicates time as shown in FIG. 3.

It will be understood from the above-mentioned description that the device according to the present invention can achieve channel display and time display with one digital display section since the digital display section is connected to a switching circuit to which a phase-locked loop and a time counting section are connected, also, it requires no separate part to be used as a time counting reference section and guarantees accurate time counting since the time counting section is connected to the reference oscillator of the phase-locked loop through a frequency divider.

Obviously, numerous modifications and variations of the present invention are possible in light of the above teachings. It is therefore to be understood that within the scope of the appended claims, the invention may be practiced otherwise than as specifically described herein.

What is claimed is:

1. A display device for a transceiver and the like comprising:
   a phase-locked loop,
   a pulse generating section,
   a phase-locked loop control section for channel selecting connected to said phase-locked loop,
   a time-counting section for time-counting connected to said pulse-generating section,
   a change-over circuit connected to the phase-locked loop control section and to the time-counting section for selectively transmitting channel selecting signals received from said phase-locked loop control section and time counting signals received from said time-counting section,
   an electronic display section connected to said change-over circuit and responsive to the channel selecting and the time-counting signals transmitted therefrom for selectively carrying out channel display and time display; and
   a change-over switch for controlling the switching operation of said change-over circuit.

2. A display device for a transceiver and the like as set forth in claim 1, wherein said pulse-generating section is a reference oscillator which is connected to said time-counting section through a frequency divider.

3. A display device for a transceiver and the like as set forth in claim 1, wherein said pulse-generating section is an independent crystal oscillator which is connected to said time-counting section through an oscillatory frequency divider.

4. A display device for a transceiver and the like as set forth in claim 1, wherein said pulse-generating section is a commercial power supply which is connected to said time-counting section through a converter.

5. A display device for a transceiver and the like as set forth in claim 1, wherein said time-counting section is adapted to be selectively connected to a reference oscillator in said phase-locked loop through a frequency divider, to an independent crystal oscillator through an oscillatory frequency divider, and to a commercial power supply through a converter.

6. A display device for use in a transceiver or the like comprising:
   a phase-locked loop equipped with a reference oscillator,
   a phase-locked loop control section for channel selecting connected to said phase-locked loop,
   a frequency divider connected to said reference oscillator,
   a time counting section connected to said frequency divider,
   a switching circuit connected to said phase-locked loop control section and said time counting section for selectively transmitting channel selecting signals received from said phase-locked loop control section and time counting signals received from said time counting section,
   a change-over switch connected to said switching circuit, and
   an electronic digital display section for selectively carrying out channel display and time display, said digital display section being connected to said switching circuit and responsive to the channel selecting and the time counting signals transmitted therefrom.

* * * * *